No. 11,764. Reissued Aug. 8, 1899.
L. DE RANGO.
BICYCLE.
(Application filed June 13, 1899.)
Fig. 1.
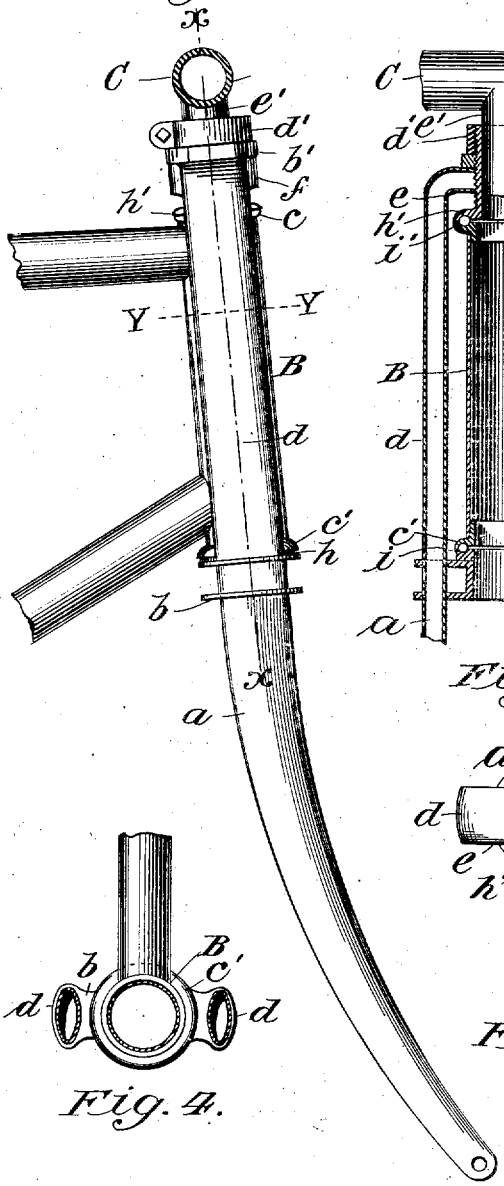
Fig. 2.
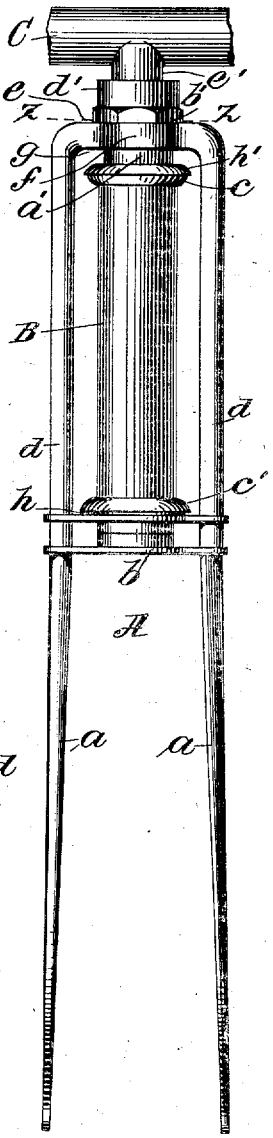
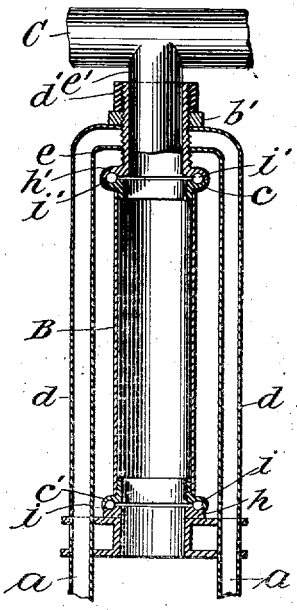
Fig. 3.
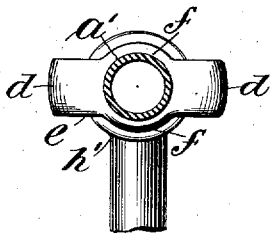
Fig. 5.
Fig. 4.
Witnesses
Edward L. Rowland
S. S. Brutchaw
Louis De Rango, Inventor
By his Attorney A. M. Pierce

UNITED STATES PATENT OFFICE.

LOUIS DE RANGO, OF SYRACUSE, NEW YORK, ASSIGNOR TO McKEE & HARRINGTON, OF NEW YORK, N. Y.

BICYCLE.

SPECIFICATION forming part of Reissued Letters Patent No. 11,764, dated August 8, 1899.

Original No. 593,814, dated November 16, 1897. Application for reissue filed June 13, 1899. Serial No. 720,436.

*To all whom it may concern:*

Be it known that I, LOUIS DE RANGO, of Syracuse, in the county of Onondaga, in the State of New York, have invented new and useful Improvements in Bicycles, of which the following, taken in connection with the accompanying drawings, is a full, clear, and exact description.

This invention consists in an improved construction of bicycles, and has special reference to the so-called "steering-fork" and its attachment to the head of the frame, as hereinafter fully described, and specifically set forth in the claim.

In the annexed drawings, Figure 1 is a side view of the head of the bicycle-frame and the steering-fork, illustrating my improvement. Fig. 2 is a front view of the same. Fig. 3 is a longitudinal section on the line X X in Fig. 1. Fig. 4 is a horizontal transverse section on line Y Y in Fig. 1, and Fig. 5 is a horizontal transverse section on line Z Z in Fig. 2.

Similar letters of reference indicate corresponding parts.

A represents the steering-fork of a bicycle, which consists of the so-called "sides" *a a* and "crown" *b*.

B represents the head of the frame, and is provided with the usual ball-bearing cups *c c'* at its upper and lower ends, respectively. The fork sides *a a* are each provided with an extension *d* above the crown *b*, which extensions and sides are all formed of a single tube bent in the center of its length, thus forming an arch *e*, which extensions extend along the opposite sides of the head B, thereby firmly bracing the same. At the center of the arch the tube is formed with two lateral deflections on its opposite sides, as shown at *f f*, and provided thereat with a screw-threaded eye *g*. On the crown *b* is secured a stationary journal-cone *h*, on which the head *b* bears by means of the cup *c'* and the usual set of balls *i i*.

In the screw-threaded eye *g* is supported the longitudinally-adjustable journal-cone *h'* by means of a short stem *a'*, formed integral with said cone, which cone bears on the cup *c* at the upper end of the head B by means of another set of antifriction-balls *i' i'*, and on said stem is a jam-nut *b'*, which bears against the upper side of the arch *e* to hold the journal-cone *h'* in its adjusted position.

The stem *a'* is provided with a clamp *d'* to compress the same to grip the stem *e'* of the handle-bar C, seated therein. Said stem *a'* is slit longitudinally at its upper end in the usual and well known-manner. (Not necessary to be shown.)

To remove the fork from the head, all that is necessary is to loosen the nut *b'* and then screw up the stem *a'*, whereby the head will be released, and it will be thus observed that in removing said fork the handle-bar stem *e'* remains in the stem *a'*. In prior constructions it has been necessary to remove the handle-bar stem before the fork could be removed.

Each of the fork sides *a a* and its extension *d* may be formed of one tube and brazed or otherwise joined together to form the arch *e*, or said sides and the extensions may be each of separate tubes and suitably brazed together. I therefore do not limit myself to forming the same of one tube, as shown in the accompanying drawings.

What I claim is—

In a bicycle, the combination of the steering-fork having extensions above its crown, a journal-cone on said crown, the lower end of the head of the frame supported on said cone, said extensions being joined above said head and formed integral and with a screw-threaded eye therein, a longitudinally-adjustable stem in said eye and provided with a journal-cone at its lower end to support the upper end of the aforesaid head, a jam-nut on said stem to hold the same in its adjusted position, a longitudinally-adjustable handle-bar stem in the aforesaid stem, and a clamp to hold said handle-bar stem in its adjusted position, as set forth.

LOUIS DE RANGO.

Witnesses:
ELMER E. YOUNG,
THOS. C. DE RANGO.